United States Patent
Ho et al.

(10) Patent No.: US 10,798,158 B1
(45) Date of Patent: Oct. 6, 2020

(54) NETWORK SYSTEM AND DECISION METHOD

(71) Applicant: INSTITUTE FOR INFORMATION INDUSTRY, Taipei (TW)

(72) Inventors: Chih-Hsiang Ho, Taipei (TW); Chih-Hang Wang, Taipei (TW); De-Nian Yang, Taipei (TW)

(73) Assignee: INSTITUTE FOR INFORMATION INDUSTRY, Taipei (TW)

(*) Notice: Subject to any disclaimer, the term of this patent is extended or adjusted under 35 U.S.C. 154(b) by 0 days.

(21) Appl. No.: 16/702,570

(22) Filed: Dec. 4, 2019

(30) Foreign Application Priority Data

Nov. 7, 2019 (TW) .............................. 108140502 A

(51) Int. Cl.
| | |
|---|---|
| *H04L 12/24* | (2006.01) |
| *H04L 29/08* | (2006.01) |
| *H04L 12/26* | (2006.01) |
| *G06F 1/28* | (2006.01) |

(52) U.S. Cl.
CPC ............ *H04L 67/1008* (2013.01); *G06F 1/28* (2013.01); *H04L 43/16* (2013.01); *H04L 67/125* (2013.01)

(58) Field of Classification Search
None
See application file for complete search history.

(56) References Cited

U.S. PATENT DOCUMENTS

| | | | | |
|---|---|---|---|---|
| 10,104,672 | B2* | 10/2018 | Shah | H04L 67/12 |
| 2011/0313874 | A1* | 12/2011 | Hardie | G06Q 30/0639 705/26.1 |
| 2012/0176252 | A1* | 7/2012 | Drew | G05D 23/1902 340/870.02 |
| 2014/0163746 | A1* | 6/2014 | Drew | F24F 11/30 700/276 |

\* cited by examiner

*Primary Examiner* — Natisha D Cox
(74) *Attorney, Agent, or Firm* — CKC & Partners Co., LLC

(57) ABSTRACT

A network system includes Internet of Things (IoT) devices, computation server, and gateways. At least one of the computation servers is configured to: tag, according to a signal quality of a signal of the IoT devices, the IoT devices as first devices and second devices; compute a device number of the first devices connecting with the gateways, and while the gateways are connected to the second devices, compute a gateway number the second devices capable of connecting to; compute a load index associated with the device number and the gateway number of the gateways; compute a transmission energy consumption index of a first link between the gateways and the computation servers; select, according to the load index and the transmission energy consumption index of the gateways; and obtain a communication network, wherein the communication network comprises the first devices, the second devices, and the gateways selected.

26 Claims, 6 Drawing Sheets

NETWORK SYSTEM AND DECISION METHOD

CROSS-REFERENCE TO RELATED APPLICATION

This application claims priority to and the benefit of Taiwan Application Serial Number 108140502, filed on Nov. 7, 2019, the entire content of which is incorporated herein by reference as if fully set forth below in its entirety and for all applicable purposes.

BACKGROUND

Field of Disclosure

The disclosure generally relates to a communication system and method, and more particularly, to a network system and a decision method.

Description of Related Art

With a progress of fast development of the Internet of Things (IoT) technology, the IoT techniques extend to a variety of applications because of the convenience for deployments. However, electric quantity of a battery is limited. If sensing data of a sensor transmitted in the network is lost, the power consumption of the sensor will be increased due to increased re-transmission time. Accordingly, how to establish a high reliability system for data transmissions and low battery consumptions in the reconfigurable network which has network hierarchies (e.g., sensors, backbone network, and core network) is an urgent problem to be solved.

SUMMARY

One aspect is directed towards a network system which includes a plurality of Internet of Things (IoT) devices, a plurality of computation servers, and a plurality of gateways. The gateways are communicatively connected to the IoT devices and the computation servers. At least one of the plurality of computation servers is configured to: tag, according to a signal quality of a signal of the plurality of IoT devices, the plurality of IoT devices as a plurality of first devices and a plurality of second devices; compute a device number of the first devices which are connected with each of the plurality of gateways, and compute a gateway number of the gateways which are capable of being connected to the second devices; compute a load index associated with the device number and the gateway number of each of the plurality of gateways; compute a transmission energy consumption index of a first link between each of plurality of gateways and each of the plurality of computation servers; select, according to the load index and the transmission energy consumption index of each of the plurality of gateways, the gateways which are to perform communication; and obtain a communication network, wherein the communication network comprises the plurality of first devices, the plurality of second devices, and the gateways as selected.

One aspect is directed towards a decision method, configured for a network system, and the network system includes a plurality of Internet of Things (IoT) devices, a plurality of computation servers, and a plurality of gateways. The gateways are communicatively connected to the IoT devices and the computation server. The decision method comprises steps of: tagging, according to a signal quality of a signal of the plurality of IoT devices, the plurality of IoT devices as a plurality of first devices and a plurality of second devices; computing a device number of the first devices which are connected with each of the plurality of gateways, and computing a gateway number of the gateways which are capable of being connected to the second devices; computing a load index associated with the device number and the gateway number of each of the plurality of gateways; computing a transmission energy consumption index of a first link between each of plurality of gateways and each of the plurality of computation servers; selecting, according to the load index and the transmission energy consumption index of each of the plurality of gateways, the gateways which will be configured to communicate with; and obtain a communication network, wherein the communication network comprises the plurality of first devices, the plurality of second devices, and the plurality of gateways which are selected.

It is to be understood that both the foregoing general description and the following detailed description are by examples, and are intended to provide further explanation of the disclosure as claimed.

DETAILED DESCRIPTION

Figure 1:
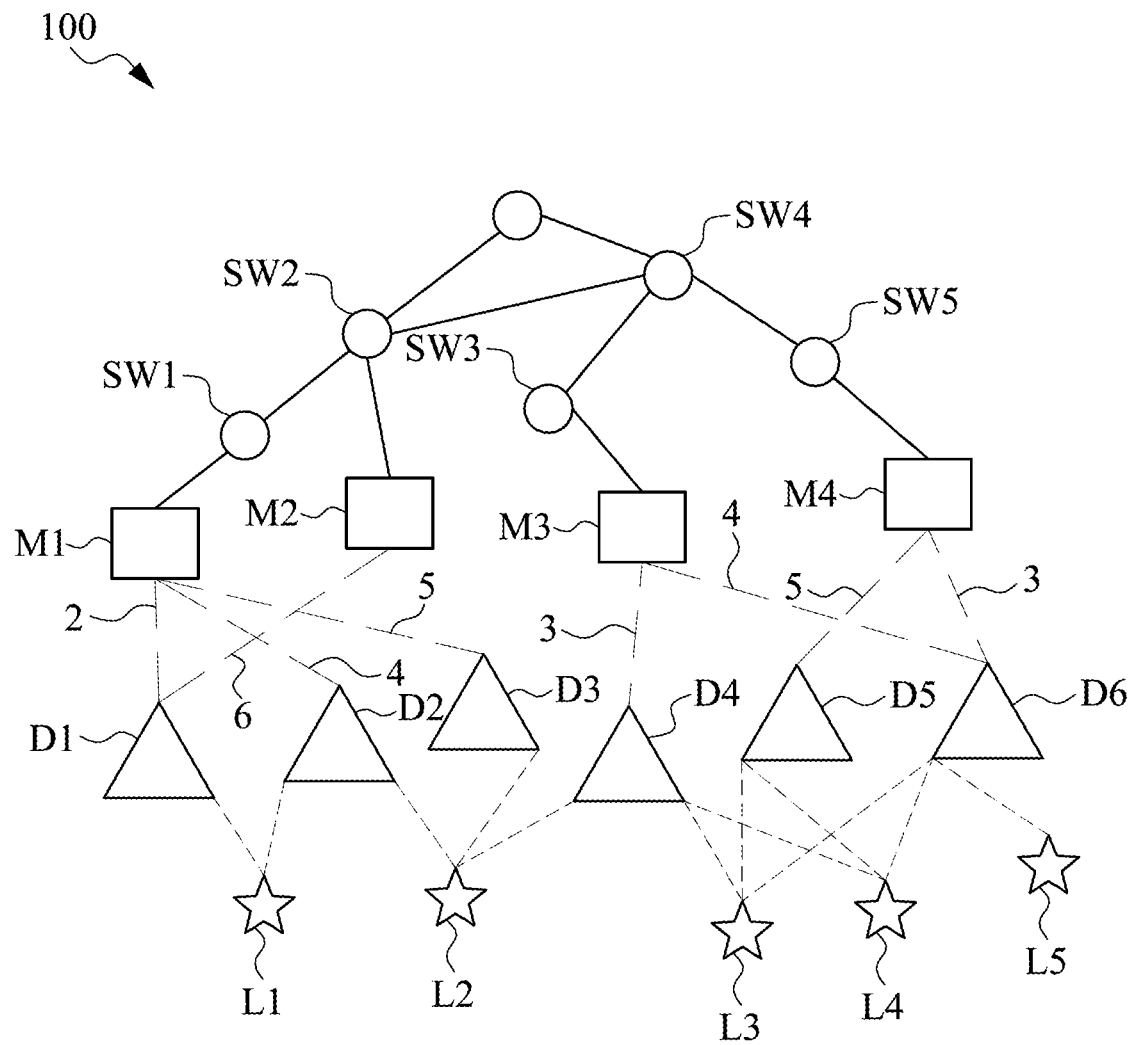
FIG. 1 is an initial network topology diagram illustrating an example of a network system in accordance with some aspects of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is an initial network topology diagram illustrating an example of a network system 100 in accordance with some embodiments of the present disclosure. The network system 100 includes a plurality of Internet of Things (IoT) devices, a plurality of computation servers, and a plurality of gateways. For example, the IoT devices of the network system 100 are many sensors which are disposed on different locations of physical environment, and configured to sense data which is acquired by these sensors and is transmitted, through the gateways, to the computation servers and a backbone network.

In some embodiments, the network system 100 includes a multi-access edge computing (MEC) network, which provides cloud computing services in the edge of the multi-access network. For example, the gateways of the network system 100 have computing ability to process data at local sites, and then transmit the processed data to the backbone network, such as cloud servers which are provided by telecom operators.

As shown in FIG. 1, the network system 100 includes the IoT devices L1~L5, the computation servers M1~M4, and the gateways D1~D6. In the hierarchical aspect, the network system 100 includes, roughly, the IoT devices L1~L5 in a first level, the gateways D1~D6 in a second level, the computation servers M1~M4 in a third level, and the switches SW1~SW5 in a fourth level. Data of the IoT devices L1~L5 can be transmitted from the first level to the fourth level. The IoT devices L1~L5 can be, but is not limited to, the sensors. The computation servers M1~M4 can be, but is not limited to, the multi-access edge computing (MEC) servers. The switches SW1~SW5 can be, but is not limited to, the switches which are provided by the telecom operators. It should be noted that the network topologies of the network system 100 of FIG. 1 is provided as one example and it can be changed by actual situation.

On the other hand, the network topology in FIG. 1 is at the initial state. For example, when the IoT devices L1~L5 are disposed at the initial state, the gateways D1~D6 will establish a basic communication link with the IoT devices L1~L5 based on a general communication protocol. In other words, links among the nodes in the network topologies are established by the general communication ability. One of purposes of the present disclosure is to find, from the initial network topology (such as the gateways D1~D6, the computation servers M1~M4, and the switches SW1~SW5), the data transmission route which cost minimal energy consumption on the whole. For further illustrating how to establish the network architecture which can conserve the energy consumption for the network system 100, the description below will be discussed with reference to FIG. 1 and FIG. 2.

Figure 2:
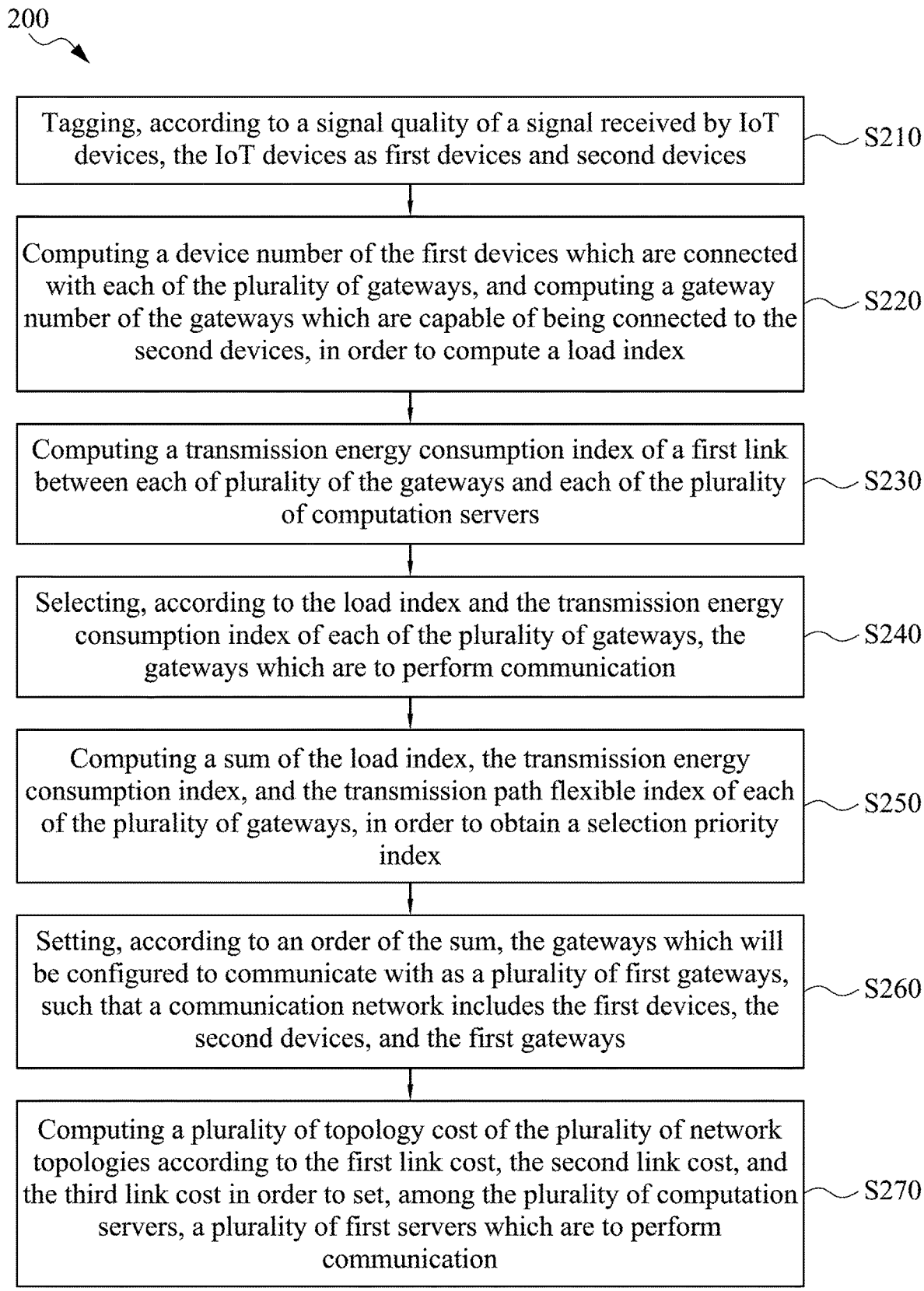
FIG. 2 is a flow chart illustrating a decision method in accordance with some aspects of the present disclosure.

Reference is made to FIG. 2, which is a flow chart illustrating a decision method 200 in accordance with some embodiments of the present disclosure. The decision method 200 is configured for the network system 100.

In step S210, according to a signal quality of a signal received by the IoT devices L1~L5, the IoT devices L1~L5 are tagged as first devices and second devices.

Figure 3:
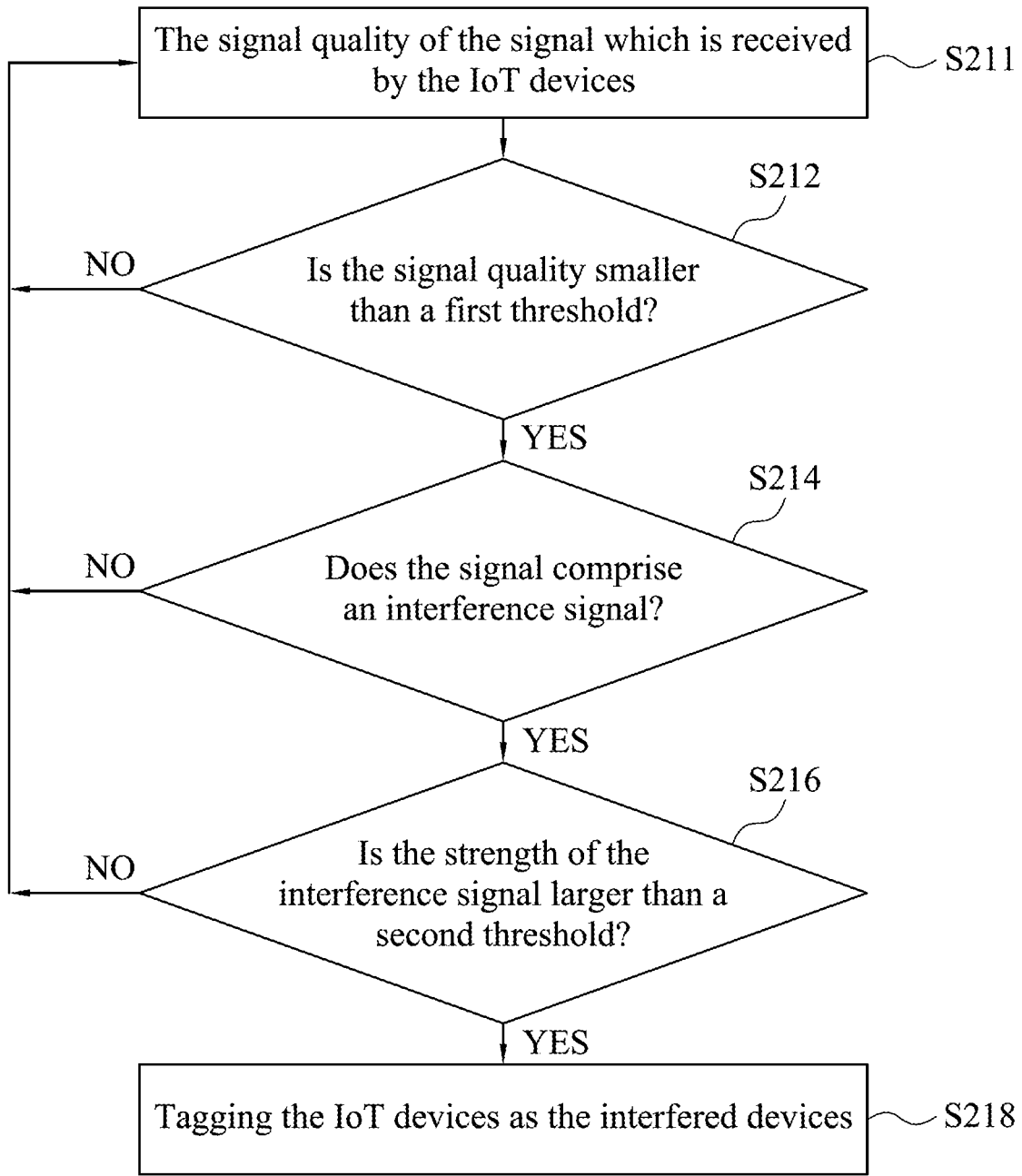
FIG. 3 is flow chart illustrating of tagging an Internet of Things (IoT) device in accordance with some aspects of the present disclosure.

In some embodiments, because there are different factors about environment (such as distances, obstacles, etc.), signal strengths of the IoT devices L1~L5 which are located in service areas of the gateways D1~D6 respectively may be different. The signal to interference and noise ratio (SINR) is taken as an example. If the IoT device is located within signal coverage of one gateway and further located at the edge of the signal coverage, the signal strength will be smaller and the SINR will be also smaller compared to those of the IoT device which is located within non-edge of the signal coverage. On the other hand, if the IoT device is located within overlapped coverage of two or more gateways, strength of interference and noise will become larger. Accordingly, the signal quality of the IoT devices L1~L5 is estimated (such as the signal quality of the IoT device L1 relative to the gateways D1 and D2, and so on) based on the initial network topology, and is transmitted, through the gateways D1~D6, to the computation servers M1~M4 in order to analyze whether any one of the IoT devices L1~L5 is the interfered device. For describing step S210, reference is made to FIG. 3. Reference is made to FIG. 3, which is a flow chart illustrating a method of tagging the IoT devices in accordance with some embodiments of the present disclosure.

In step S211, the signal quality which is received by the IoT devices L1~L5 is analyzed.

The signal quality can be the information including, for example, the signal to interference and noise ratio (SINR), the signal to interference ratio (SIR), the received signal strength indication (RSSI), and so on. The information includes the signal strength, the interference, and the noise, and can be used to determine whether the IoT devices L1~L5 are interfered devices.

In step S212, a determination of whether the signal quality is smaller than a first threshold is made.

When the IoT device is disposed at the edge of the gateway's service coverage, the signal quality of the IoT device becomes worse. Accordingly, the signal quality can be used to determine whether the IoT device is disposed at the edge of the gateway's service coverage.

In some embodiments, when the signal quality is smaller than the first threshold, step S214 is performed. When the signal quality is larger than the first threshold, the procedure goes back to step S211.

When the signal quality is smaller than the first threshold, in step S214, a determination of whether the signal includes an interference signal is made. In some embodiments, when the signal quality is smaller or equal to the first threshold, step S214 is performed. In some embodiments, the interference signal is a received power signal of an interference source. For example, the IoT devices can receive the signals of the gateways within the service coverage of the gateways, such that the signals of the gateways form the interference source of the IoT devices in the contention network.

When the IoT device is disposed within the overlapped service coverage of two or more gateways, the strength of interference signal is large. Accordingly, the signal quality can be used to determine whether the IoT device is disposed within the overlapped service coverage of two or more gateways. For example, when the signal of the IoT device includes the interference signal, a determination that the IoT device is located within the overlapped service coverage of two or more gateways is made. In step S214, when the signal includes the interference signal, step S216 is performed. When the signal does not include the interference signal or the interference signal is a minimal value, the procedure goes back to step S211.

When the signal includes the interference signal in step S214, a determination of whether the strength of the interference signal is larger than a second threshold is made in step S216.

In some embodiments, when the signal strength of the interference signal is larger than second threshold, the determination that the IoT device is located within the overlapped service coverage of two or more gateways is made, and step S218 is performed. When the signal strength of the interference signal is not larger than the second threshold, the procedure goes back to step S211.

When the IoT device is located within overlapped coverage of two or more gateways, the procedure goes to step S218. In step S218, the IoT devices are tagged as the interfered devices.

In some embodiments, when the IoT devices are disposed within the service coverage of one gateway, the IoT devices will not encounter the signal interference of different gateways. These IoT devices are referred to as non-interfered devices (or first devices) in the present disclosure. When the IoT devices are disposed within the overlapped service coverage of two or more gateways, the IoT devices will encounter the signal interference of different gateways. These IoT devices are referred to as interfered devices (or second devices) in the present disclosure. For example, as shown in FIG. 1, the IoT device L1 is disposed within the overlapped coverage of the gateways D1~D2 (i.e., the IoT device L1 can transmit data through the gateway D1 or D2).

The IoT device L2 is disposed within the overlapped coverage of the gateways D2~D4. The IoT devices L3~L4 are disposed within the overlapped coverage of the gateways D4~D6. Accordingly, the IoT devices L1~L4 are tagged as the second devices. The IoT device L5 is located only within the service coverage of the gateway D6, and thus the IoT device L5 is tagged as the first device.

In some embodiments, the computation servers M1~M4 are configured to arrange the hierarchy relation between the gateways D1~D6 and the IoT devices L1~L5, which is described below.

Referring to FIG. 2 again, in step S220, a number of the first devices which are connected with each of the plurality of gateways (hereinafter referred to as "the device number") is computed, and a gateway number of the gateways which are capable of being connected to the second devices (hereinafter referred to as "the gateway number") is computed, in order to compute a load index.

The following description is related to how to compute the device number and the gateway number associated with the gateway D1. As shown in FIG. 1, in some embodiments, the IoT devices L1~L4 are interfered devices and the IoT devices L5 is a non-interfered device.

In some embodiments, the load index of the present disclosure can be calculated by function (1).

$$l(i) = \text{the number of non-interfered } IoT \text{ devices within } Di + \sum_{j=1}^{m} \frac{1}{IoT \text{ device } j \in \text{ the number of } IoT \text{ Gateways}} \quad \text{function (1)}$$

In function (1), l(i) is the load index of the gateway Di, in which Di is the index of the gateway. The number of non-interfered IoT devices within the gateway Di of function (1) is the device number of the non-interfered devices (first devices) which are connected to the gateway Di. "IoT device j∈ the number of IoT Gateways" of function (1) is, among the interfered devices (i.e., the second devices) which are connected to the gateway Di, the gateway number which are capable of being connected to the interfered devices.

The gateways D6 is taken as an example. The IoT device L5 is the non-interfered device which is connected to the gateway D6. Therefore, the number of non-interfered IoT devices associated with the gateways D6 is 1. On the other hand, the interfered IoT device L3 which belongs to the gateway D6 can be connected to the gateways D4, D5, and D6. Therefore, the IoT device L3 belongs to 3 gateways. Similarly, the interfered IoT device L4 which belongs to the gateway D6 can be connected to the gateways D4, D5, and D6. Therefore, the IoT device L4 belongs to 3 gateways. Accordingly, the load index of the gateway D6 can be calculated by function (1) to be 5/3 (i.e., [1+(1/3+1/3)], in which the device number of the non-interfered IoT devices within the gateway D6 is 1, and a sum of a reciprocal of the gateway number which the IoT devices L3 and L4 belongs to is 1/3+1/3). For example of the gateway D1 again, there is no non-interfered IoT device within the gateway D1. The interfered IoT device L1 which belongs to the gateway D1 can be connected to the gateways D1 and D2. Therefore, the IoT device L1 belongs to 2 gateways. Accordingly, the device number of the non-interfered IoT devices which belong to the gateway D1 is calculated and the gateway number to which the interfered IoT device L1 belongs are calculated by function (1), and the load index of the gateway D1 is 1/2 (i.e., 0+1/2, in which the device number of the non-interfered IoT devices which belongs to the gateway D1 is 0, and a reciprocal of the gateway number to which the interfered IoT device L1 belongs is 1/2). Similarly, the load index of the gateway D2 is 5/6 (i.e., 0+1/2+1/3, in which the device number of the non-interfered IoT devices which belongs to the gateway D2 is 0, and a sum of reciprocal of the gateway number which the IoT devices L1 and L2 belongs to is 1/2+1/3). The load index of the gateway D3 is 1/3 (i.e., 0+1/3). The load index of the gateway D4 is 1 (i.e., 0+1/3+1/3+1/3). The load index of the gateway D5 is 2/3 (i.e., 0+1/3+1/3).

In step S230, a transmission energy consumption index of a first link between each of plurality of gateways and each of the plurality of computation servers is computed.

In some embodiments, the transmission energy consumption index can be calculated by function (2).

$$u(i) = \frac{1}{\frac{\sum_{k=1}^{n} \text{energy consumption of } kth \text{ path for 1 unit data transmission}}{n}} \quad \text{function (2)}$$

In function (2), u(i) is the transmission energy consumption index of the gateway Di. The energy consumption of kth path for 1 unit data transmission is the energy consumption of the path (or called a first link) between gateway Di and the computation servers. The transmission energy consumption index is a reciprocal of an average of a sum of the energy consumption of the first links. For example, as shown in FIG. 1, the energy consumption of the path between the gateway D1 and the computation server M1 is 2, the energy consumption of the path between the gateway D1 and the computation server M2 is 6, the energy consumption of the path between the gateway D2 and the computation server M1 is 4, and so on.

By computations of function (2), the transmission energy consumption index of the gateway D1 is 1/4 (i.e., [1/(2+6)/2]), the transmission energy consumption index of the gateway D2 is 1/4, the transmission energy consumption index of the gateway D3 is 1/5, the transmission energy consumption index of the gateway D4 is 1/3, the transmission energy consumption index of the gateway D5 is 1/5, and the transmission energy consumption index of the gateway D6 is 1/3.5 (i.e., [1/(4+3)/2]).

In step S240, according to the load index and the transmission energy consumption index of each of the plurality of gateways, the gateways which will be configured to perform communication are selected, in order to obtain a communication network. The communication network includes the first devices, the second devices, and the gateways which are selected.

In some embodiments, before the gateways are selected to communicate with the IoT devices, a transmission path flexible index of each of the plurality of gateways is calculated. The transmission path flexible index can be calculated by function (3).

$$p(i) = \frac{\left(\sum_{k \in n} \text{energy consumption of } kth \text{ path for 1 unit data transmission}\right)^2}{\sum_{k \in n} (\text{energy consumption of } kth \text{ path for 1 unit data transmission})^2} \quad \text{function (3)}$$

In function (3), p(i) is the transmission path flexible index of the gateway Di. The energy consumption of kth path for 1 unit data transmission is the energy consumption of the path between the gateway Di and the computation servers. The transmission path flexible index is obtained by computing a square of a sum of the energy consumption of all the first paths of the gateway Di and a sum of a square of the energy consumption of all the first paths of the gateway Di (i.e., the square of the sum of the energy consumption divided by the sum of the square of the energy consumption).

In some embodiments, by computation of function (3), the transmission path flexible index of the gateway D1 is 8/5 (i.e., $$\frac{(2+6)^2}{(2^2+6^2)}),$$

the transmission path flexible index of the gateway D2 is 1, the transmission path flexible index of the gateway D3 is 1, the transmission path flexible index of the gateway D4 is 1, the transmission path flexible index of the gateway D5 is 1, and the transmission path flexible index of the gateway D6 is 49/25.

In some embodiments, after the transmission path flexible index of each gateway is obtained, in step S250, a sum of the load index, the transmission energy consumption index, and the transmission path flexible index of each of the plurality of gateways is computed, in order to obtain a selection priority index, which is calculated by function (4).

$$w(i)=\alpha \times l(i)+\beta \times u(i)+\gamma \times p(i) \qquad \text{function (4)}$$

In function (4), w(i) is the selection priority index of the gateway Di, and α, β, γ are weighting factors, the sum of which is 1. For detailed description of the selection priority index, the embodiments that α is 0.3, β is 0.35, and γ is 0.35 are given for discussions below. The selection priority index of each gateway is computed by multiplying the load index by the weighting factor α, multiplying the transmission energy consumption index by the weighting factor β, multiplying the transmission path flexible index by the weighting factor γ, and adding these results to have a sum. It should be noted that it is not limited to the weighting factor values which are provided herein, and the values of the weighting factors can be adjusted according to actual operations or demands. For example, the more important the variable is, the larger the weighting factor is.

By computations of function (4), the selection priority index of the gateway D1 is 0.7975 (i.e., [0.3x(1/2)+0.35x(1/4)+0.35x(8/5)]). Similarly, the selection priority index of the gateway D2 is 0.6875, the selection priority index of the gateways D3 is 0.52, the selection priority index of the gateway D4 is 0.7667, the selection priority index of the gateways D5 is 0.62, and the selection priority index of the gateways D6 is 1.286 (i.e., [0.3x(5/3)+0.35x(1/3.5)+0.35x(49/25)]).

In step S260, according to an order of the sum (i.e., the selection priority index), the gateways which will be configured to perform communication are set as a plurality of first gateways, such that a communication network includes the first devices, the second devices, and the first gateways.

For example, the descend order of the selection priority indices of all the gateways is 1.286 (of the gateway D6), 0.7975 (of the gateway D1), 0.7667 (of the gateway D4), 0.6875 (of the gateway D2), 0.62 (of the gateway D5), and 0.52 (of the gateway D3). The selection priority indices of all the gateways are taken into consideration. In some embodiments, the gateway which has the largest selection priority index is selected first, and the IoT devices which the selected gateway serves are recorded. Then, the gateway which has the second large selection priority index is selected, and the IoT devices which the selected gateway serves are recorded. The procedure is repeated until all the IoT devices are served by multiple (such as 2) gateways, which is described below.

In some embodiments, the gateways which are connected to the non-interfered device (the first devices) are set as the first gateways at first. For example, as shown in FIG. 1, the IoT device L5 is the non-interfered device (the first device), and the IoT device L5 is only connected to the gateway D6. Therefore, the gateway D6 will be selected at first, in order to be set as the first gateway. Accordingly, because the IoT device L5 is located at the edge network and the gateway D6 is selected at first, it is confirmed that the IoT device L5 can be served to transmit data through the gateway D6 to a core network.

In some embodiments, the interfered devices (the second devices) which are served by each gateway are checked in the descend order of the selection priority index. If the number of the interfered devices (the second devices) which are served by the gateways in the communication network is not more than a specific number, the next gateways are selected based on the descend order, for setting the selected gateways as the first gateways. Therefore, multiple links between each second device and the first gateway are established. For example, the descend order of the selection priority index is an order of the gateways D6, D1, D4, D2, D5, and D3. The number of the multiple links, which is 2, is taken as an example (that is, each IoT device is connected to two gateways (or called "double links"). For example, one IoT device can be served by one of two gateways, and the other gateway performs as a backup gateway). First, the gateway D6 is set as the first gateway (which is described as above). The gateway D6 serves not only the IoT device L5 (because the IoT device L5 is the first device, it is not considered whether the multiple links between the IoT device L5 and the gateways exist), but also the IoT devices L3 and L4. Then, the gateway D1 which has the second large selection priority index is set as the first gateway, in which the gateway D1 can only serve the IoT device L1. The gateway D4 which has the third large selection priority index is set as the first gateway, in which the gateway D4 can serve the IoT devices L2, L3, and L4. The gateway D2 which has fourth large selection priority index is set as the first gateway, in which the gateway D2 can serve the IoT devices L1 and L2. Because the gateways D1, D4, and D2 ensure that each of the interfered IoT devices L1~L4 (the second devices) can be connected with two gateways (double links), in which one is a connection link and the other is a backup link, the gateways D3 and D5 are not considered to be relay nodes for data transmissions of the IoT devices in the embodiment, and the gateways D3 and D5 which have not been set as the first gateways are stopped setting. It should be noted that the number of the multiple links is not limited to 2, and any default number of links can be applied in the present disclosure.

In some embodiments, the remained gateways D3 and D5 are set to enter a sleep mode or to turn off.

Figure 4:
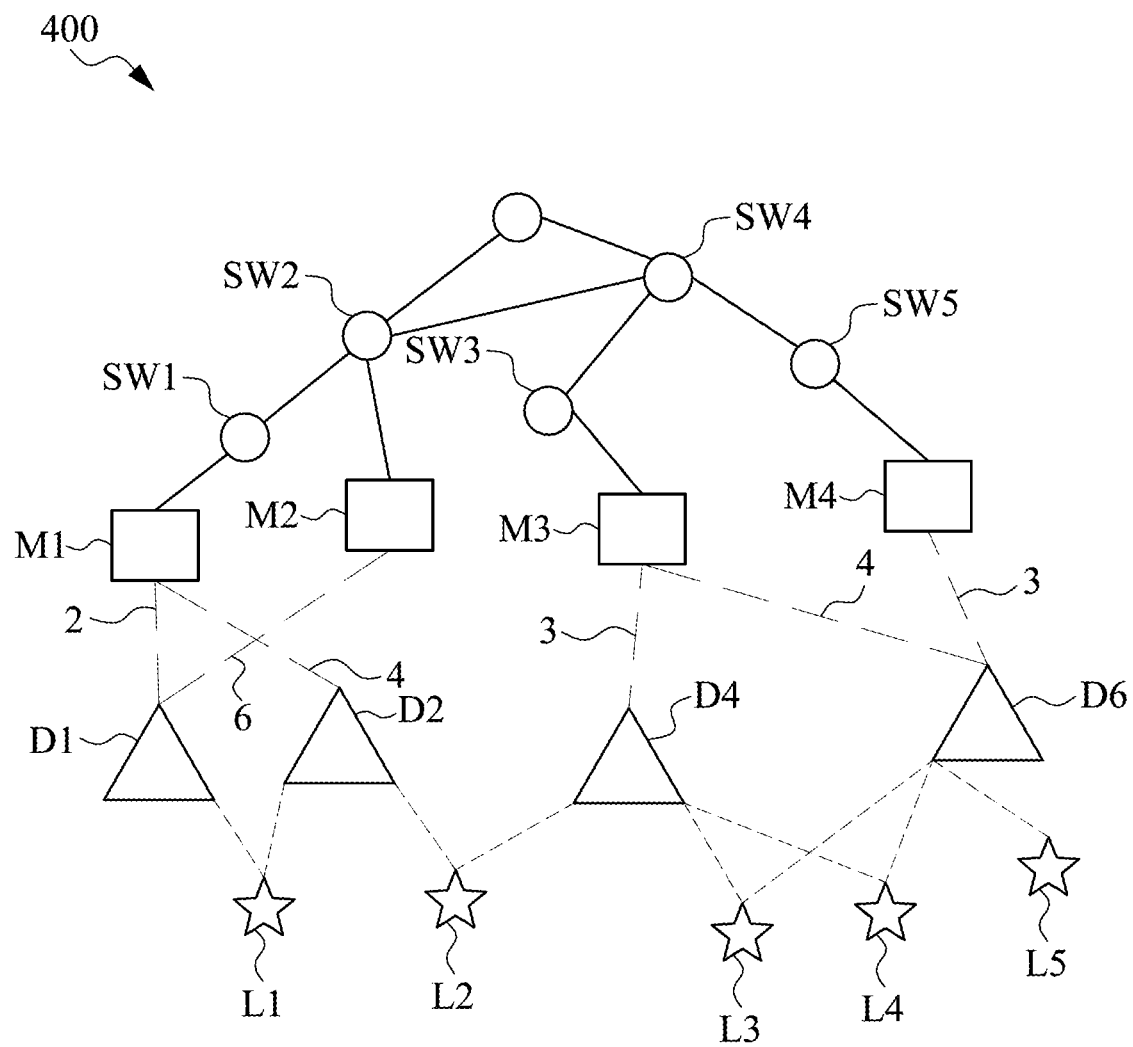
FIG. 4 is a diagram illustrating an example of a network system in accordance with some aspects of the present disclosure.

Reference is made to FIG. 4, which is a diagram illustrating an example of a network system 400 in accordance with some embodiments of the present disclosure. After the decision method 200 is executed, the network system 400 is obtained and the network system 400 can save more energy consumption. For example, there are six gateways D1~D6 for serving the IoT devices L1~L5 in the network system 100 of FIG. 1, and only four gateways D1, D2, D4, and D6 should be activated for serving the IoT devices L1~L5 in the network system 400 of FIG. 4 after the optimization. In the embodiment, the communication network includes the gateways D1, D2, D4, D6 and the IoT devices L1~L5.

Referring to FIG. 2 again, in step S270, a plurality of topology cost of the plurality of network topologies are computed according to the first link cost, the second link cost, and the third link cost, in order to set, among the plurality of computation servers, a plurality of first servers which will be configured to perform communication.

It should be noted that "the first links" represents the links between the gateways and the computation servers, "the second links" represents the links between the gateways and the IoT devices, "the third links" represents the links among the switches from the computation servers to the computation servers and the path of the third links can be influenced by the gateways. On the other hand, "the first link cost", "the second link cost", and "the third link cost" represent the total cost of the first link, the second link, and the third link respectively.

For example, as shown in FIG. 4, the link between the computation server M1 and the gateway D1 is the first link, and the cost of the first link between the computation server M1 and the gateway D1 is 2 (its unit can be any type of distance). The link between the IoT device L1 and the gateway D1 is the second link, and the cost of the second link between the IoT device L1 and the gateway D1 is 1 (unit). When data is transmitted among the computation servers M1~M4, the third links can be counted by the total links among the switches SW1~SW5. For example, the data is transmitted from the computation server M1, through the switches SW1 and SW2, and transmitted to the computation server M2. The total link cost is 3 and thus the third link cost is 3, and the rest is deduced by analogy.

In some embodiments, function (5) is applied for computing the topology cost of the plurality of network topologies to obtain the smallest one of the plurality of topology cost. Function (5) is described below.

$$\text{Minimize} \sum_{d \in D} E_d^{IoT} + \sum_{m \in M} E_m^{MEC} + \sum_{v \in V} E_v^{switch} \quad \text{function (5)}$$

The result of function (5) is a total energy consumption of the communication network. In function (5), $\sum_{d \in D} E_d^{IoT}$ is a sum of the first link cost in the communication network, $\sum_{m \in M} E_m^{MEC}$ is a sum the second link cost of the communication network, and $\sum_{v \in V} E_v^{switch}$ is a sum of the third link cost of the communication network. It should be noted that the communication network here is the network topology which is changed by applying at least foresaid step S260 for eliminating the gateways D3 and D5.

It should be noted that the network system 400 of FIG. 4 includes multiple network topologies (that is, there are many different possible paths from the IoT devices L1~L5 to the computation servers M1~M4. For example, data of the IoT device L1 can be transmitted through the gateway D1 to the computation server M1, data of the IoT device L2 can be transmitted through the gateway D4 to the computation server M3, data of the IoT device L3 can be transmitted though the gateway D6 to the computation server M3, data of the IoT device L4 can be transmitted through the gateway D4 to the computation server M3, and data of the IoT device L5 can be transmitted through the gateway D6 to the computation server M4. Each combination is treated as one network topology.) How to compute the smallest (the minimal) energy consumption of the network topologies with these network nodes is described below.

Figure 5A:
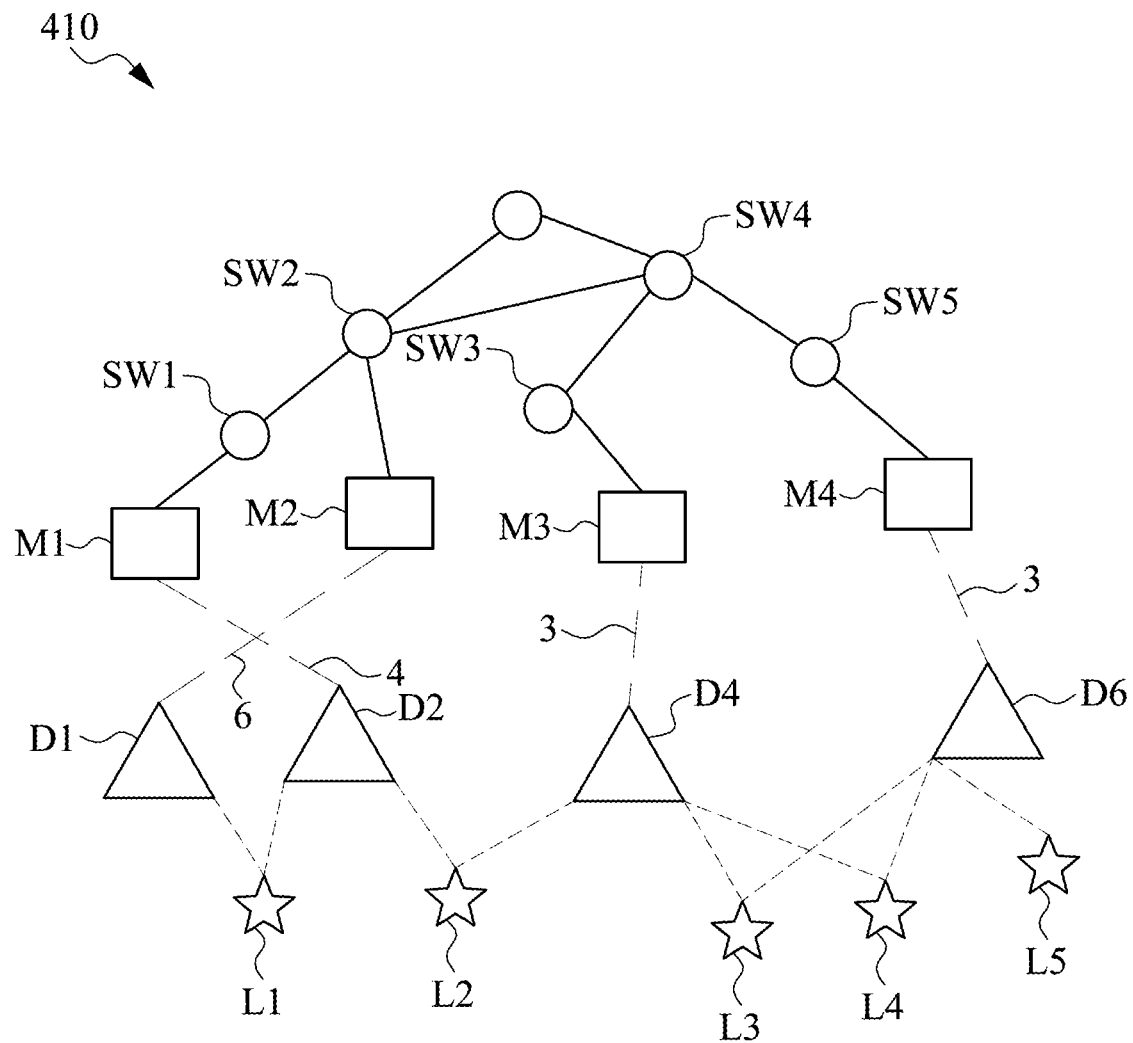
FIG. 5A and FIG. 5B are diagrams illustrating two examples of network topology obtained from FIG. 4.
Figure 5B:
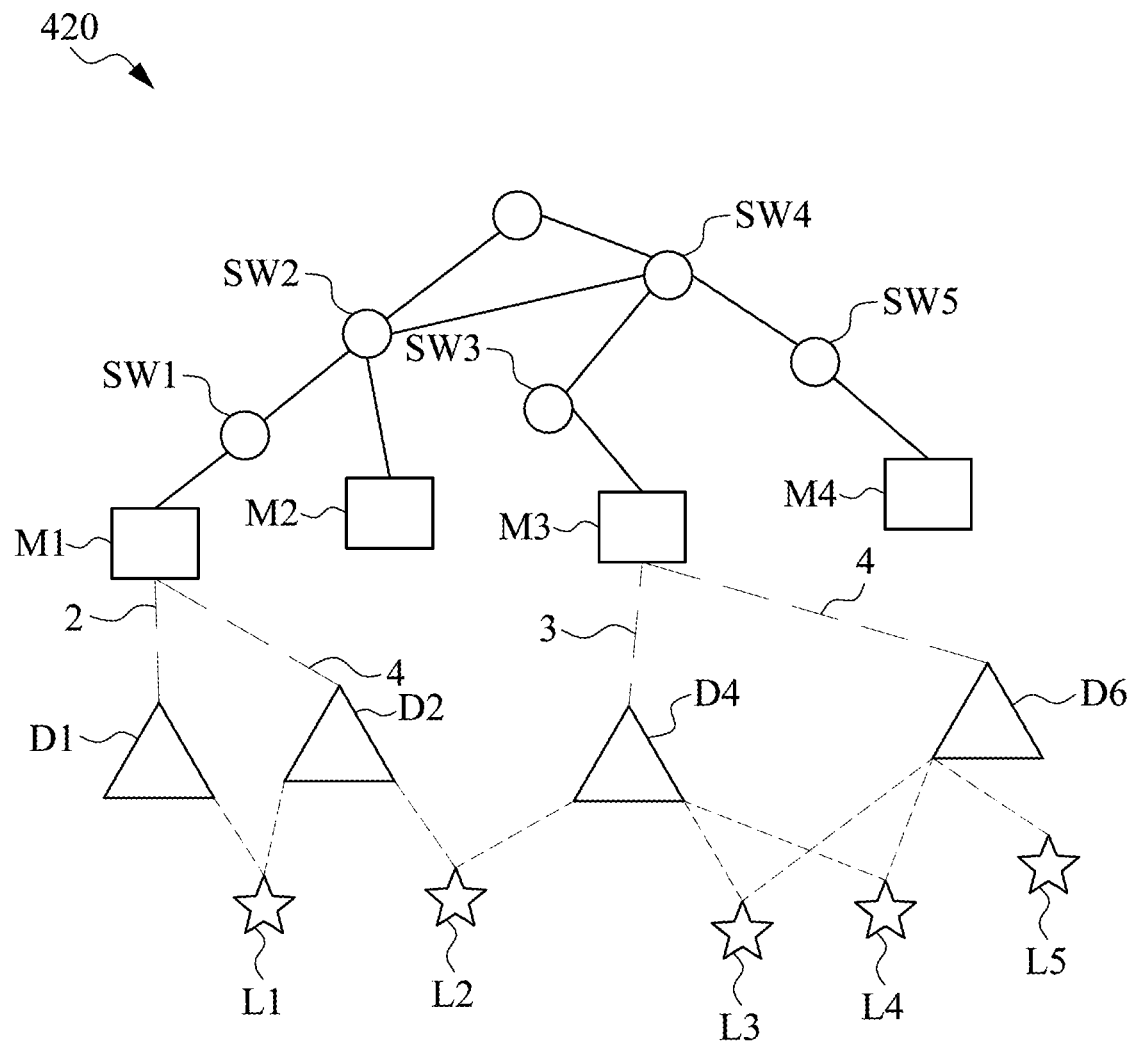

Two network topologies are taken as two examples for further description. Reference is made to FIG. 5A and FIG. 5B, which are diagrams illustrating two examples of network topologies 410 and 420 obtained from FIG. 4.

As shown in FIG. 4, the gateway D1 can communicate with the computation servers M1 and M2 respectively (i.e., two first links). FIG. 5A illustrates that the gateway D1 is selected to link with the computation server M2, and the first link cost is 6. Similarly, when the gateway D2 is selected to link with the computation server M1, the first link cost is 4. When the gateway D4 is selected to link with the computation server M3, the first link cost is 3. When gateway D6 is selected to link with the computation server M4, the first link cost is 3. Accordingly, the sum of the first link cost is 16.

In some embodiments, the routes may be different when the IoT devices transmit packets based on actual situations. For example, the IoT device L1 is connected to the gateways D1 and D2, and meanwhile the gateway D1 is connected to the computation servers M1 and M2. The packets of the IoT device L1 can be transmitted through the gateway D1 to the computation server M1 or M2. Additionally, the packets of the IoT device L1 can be transmitted through the gateway D2 to the computation server M1. In the procedure of computing the third link cost, for example, the IoT device L1 has to be connected to the computation server M2 but the path which the gateway selects is not restricted. If the gateway D1 decides to forward data to the computation server M1, the data has to be forwarded from the computation server M1 to the switch SW1, and further forwarded from the switch SW1 to the switch SW2, and further forwarded from the switch SW2 to the computation server M2. The total link cost is 3. Accordingly, the third link cost related to the IoT device L1 is 3 (the cost per link is 1, for example). Similarly, the third link cost of the IoT devices L1~L5 is illustrated in TABLE 1. The third link cost related to each IoT device can be calculated. In the embodiment, the sum of the third link cost is 16.

TABLE 1

| The IoT device | third link cost | | | | |
|---|---|---|---|---|---|
| | L1 | L2 | L3 | L4 | L5 |
| The computation server which is connected to the gateways (that is, the target computation server which the data will be transmitted to) | M2 | M1 | M3 | M3 | M4 |
| The third link cost | 3 | 5 | 4 | 4 | 0 |

In some embodiments, the links between each IoT device and the gateways are called the second links. For example, the IoT device L1 is connected to the gateways D1 and D2, and the number of second links is 2. Furthermore, the computation server has to perform computations twice for the data transmitted once by the IoT device L1. Therefore, the second link cost related to the IoT device L1 is 2 (the cost per link is 1, for example). Similarly, the second link cost related to the IoT devices L1~L5 is illustrated in TABLE 2.

The second link cost related to each IoT devices can be calculated. In the embodiment, the sum of the second link cost is 9.

TABLE 2

| | the second link cost | | | | |
|---|---|---|---|---|---|
| The IoT device | L1 | L2 | L3 | L4 | L5 |
| The second link cost | 2 | 2 | 2 | 2 | 1 |

Furthermore, the sum of the first link cost, the sum of the second link cost, and the sum of third link cost are added together according to function (5) to have a result. The total energy consumption of the network topology 410 in FIG. 5A is the result, i.e., 41.

As shown in FIG. 4, the gateway D1 can communicate with the computation servers M1 and M2 (i.e., two first links). FIG. 5B illustrates that the gateway D1 is selected to link with the computation server M1, and the first link cost is 2. Similarly, the cost of the first link between the gateway D2 and the computation server M1 is 4. The cost of the first link between the gateway D4 and the computation server M3 is 3. The cost of the first link between the gateway D6 and the computation server M3 is 4. Accordingly, the sum of the first link cost is 13.

In some embodiments, the routes may be different when the IoT devices transmit packets based on actual situations. For example, the IoT device L1 has to be connected to the computation server M1 but the path which the gateway selects is not restricted. If the gateway D1 decides to forward data to the computation server M1, the data does not have to be forwarded through the switches SW1~SW5. At this time, the third link cost related to the IoT device L1 is 0. Similarly, the third link cost related to the IoT devices L1~L5 is illustrated in TABLE 3. The third link cost related to each IoT device can be calculated. In the embodiment, the sum of the third link cost is 5.

TABLE 3

| | third link cost | | | | |
|---|---|---|---|---|---|
| The IoT device | L1 | L2 | L3 | L4 | L5 |
| The computation server which is connected to the gateways (that is, the target computation server which the data will be transmitted to) | M1 | M1 | M3 | M3 | M3 |
| The third link cost | 0 | 5 | 0 | 0 | 0 |

In some embodiments, the links between each IoT device and the gateways are called the second links. For example, the IoT device L1 is connected to the gateways D1 and D2, and the number of the second links is 2. Furthermore, the computation server has to perform computations twice for the data transmitted once by the IoT device L1. Therefore, the second link cost related to the IoT device L1 is 2 (the cost per link is 1, for example). Similarly, the second link cost related to the IoT devices L1~L5 is illustrated in TABLE 4. The second link cost related to each IoT devices can be calculated. In the embodiment, the sum of the second link cost is 9.

TABLE 4

| | the second link cost | | | | |
|---|---|---|---|---|---|
| The IoT device | L1 | L2 | L3 | L4 | L5 |
| The second link cost | 2 | 2 | 2 | 2 | 1 |

Furthermore, the sum of the first link cost, the sum of the second link cost, and the sum of third link cost are added together to have a result. The total energy consumption of the network topology 420 in FIG. 5B is the result, i.e., 27.

Because the total energy consumption of the communication network based on the network topology 420 in FIG. 5B is smaller than the total energy consumption of the communication network based on the network topology 410 in FIG. 5A, it means that the path of the computation server M1 chosen by the gateway D1 costs less than the path of the computation server M2.

Similarly, by computing the total energy consumption of all the communication networks according to function (5), the smallest (minimal) total energy consumption is found in order to obtain the communication network which has the smallest total energy consumption.

It should be noted that two network topologies of FIG. 5A and FIG. 5B are two embodiments of the network topologies in the present disclosure for describing how to calculate the total energy consumption of all the possible communication networks in FIG. 4, in order to obtain the smallest total energy consumption of all the possible communication networks. For example, if there are only two possible communication networks (such as the network topologies 410 and 420), the total energy consumption is calculated according to function (5) and the smallest total energy consumption (or called as the topology cost), i.e., 27, is obtained. In other words, after the decision method 200 is executed, the network topology 420 is selected to be the communication network. In other words, for the gateway D1, the path to the computation server M1 will be the path which has the priority (instead of the path to the computation server M2). Similarly, for the gateway D6, the path to the computation server M3 will be the path which has the priority (instead of the path to the computation server M4). In the network system 400 of FIG. 4, the link between the gateway D1 and the computation server M2 and the link between the gateway D6 and the computation server M4 will be canceled or set as backup links. Accordingly, the network system 400 can be optimized to be the network system with the network topology 420 of FIG. 5B, such that the network system with the network topology 420 is the communication network saving energy most.

As described above, the network system and the decision method of the present disclosure can find the energy-saving network topology effectively in the complex network system. Without removing any IoT device or sensing device, the entire network system still satisfies the requirement of the multi-access edge computing network and increases the efficiency of the entire network system. Furthermore, the complexity of the algorithm is decreased. The optimized reconfigurable network possesses both the minimized energy consumption and the maximized transmission reliability.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A network system comprising:
a plurality of Internet of Things (IoT) devices;
a plurality of computation servers; and
a plurality of gateways communicatively connected to the plurality of IoT devices and the plurality of computation servers, wherein at least one of the plurality of computation servers is configured to:
tag, according to a signal quality of a signal of the plurality of IoT devices, the plurality of IoT devices as a plurality of first devices and a plurality of second devices;
compute a device number of the first devices connected with each of the plurality of gateways, and compute a gateway number of the gateways which are capable of being connected to the second devices;
compute a load index associated with the device number and the gateway number of each of the plurality of gateways;
compute a transmission energy consumption index of a first link between each of plurality of gateways and each of the plurality of computation servers;
select, according to the load index and the transmission energy consumption index of each of the plurality of gateways, the gateways which are to perform communication; and
obtain a communication network, wherein the communication network comprises the plurality of first devices, the plurality of second devices, and the gateways as selected.

2. The network system of claim 1, wherein at least one of the plurality of computation servers is further configured to:
analyze the signal quality of each of the plurality of IoT devices; and
determine whether the signal comprises an interference signal when the signal quality is smaller than a first threshold.

3. The network system of claim 2, wherein at least one of the plurality of computation servers is further configured to:
determine whether strength of the interference signal is larger than a second threshold when the signal comprises the interference signal; and
tag the plurality of IoT devices as the second devices when the strength of the interference signal is larger than the second threshold.

4. The network system of claim 3, wherein IoT devices of the plurality of IoT devices, that are not tagged as the second devices, are tagged as the first devices.

5. The network system of claim 1, wherein the device number is a number of the first devices which are connected with each of the plurality of gateways, and at least one of the plurality of computation servers is further configured to:
compute a number of all the gateways to which the second devices belongs in condition that the second devices are connected with each of the plurality of gateways, in order to obtain the gateway number; and
compute, according to the device number and the gateway number, the load index of each of the plurality of gateways.

6. The network system of claim 1, wherein the transmission energy consumption index of each of the plurality of gateways is a reciprocal of an average of an energy consumption sum of the first link.

7. The network system of claim 1, wherein at least one of the plurality of computation servers is further configured to:
compute, according to a square of an energy consumption sum of the first link and a sum of an energy consumption square of the first link, a transmission path flexible index of each of the plurality of gateways.

8. The network system of claim 7, wherein at least one of the plurality of computation servers is further configured to:
compute a sum of the load index, the transmission energy consumption index, and the transmission path flexible index of each of the plurality of gateways; and
set, according to an order of the sum, the gateways which are to perform communication as a plurality of first gateways;
wherein the communication network comprises the plurality of first devices, the plurality of second devices, and the plurality of first gateways.

9. The network system of claim 8, wherein at least one of the plurality of computation servers is further configured to:
set the gateways which are capable of establishing links with the plurality of first devices, as the plurality of first gateways; and
set, according to the order of the sum of the load index, the transmission energy consumption index, and the transmission path flexible index of each of the plurality of gateways, some of the gateways as the gateways which are configured to establish links with the plurality of second devices;
wherein when each of the plurality of second devices is connected, with a default number of links, to some of the plurality of first gateways, the gateways which are not set as the first gateways are stopped setting.

10. The network system of claim 8, wherein at least one of the plurality of computation servers is further configured to:
set the gateways which are not selected to enter a sleep mode.

11. The network system of claim 8, wherein at least one of the plurality of computation servers is further configured to:
obtain a first link cost of the first link between each of the plurality of first gateways and each of the plurality of computation servers;
obtain a second link cost of a second link between each of the plurality of first gateways and each of the plurality of first devices and between each of the plurality of first gateways and each of the plurality of second devices; and
compute a third link cost of a third link, wherein the third link cost is a number of links among the plurality of computation servers.

12. The network system of claim 11, wherein at least one of the plurality of computation servers is further configured to:
obtain a plurality of network topologies where the plurality of first devices and the plurality of second devices are served;
compute a plurality of topology costs of the plurality of network topologies according to the first link cost, the second link cost, and the third link cost; and
set, among the plurality of computation servers, a plurality of first servers which are to perform communication, according to a smallest topology cost of the plurality of topology cost.

13. The network system of claim 12, wherein at least one of the plurality of computation servers is further configured to:
obtain the communication network, wherein the communication network comprises the plurality of first devices, the plurality of second devices, the plurality of first gateways, and the plurality of first servers.

14. A decision method, configured for a network system, the network system comprising a plurality of Internet of Things (IoT) devices, a plurality of computation servers, and a plurality of gateways, the plurality of gateways communicatively connected to the plurality of IoT devices and the plurality of computation servers, wherein the decision method comprises:
tagging, according to a signal quality of a signal of the plurality of IoT devices, the plurality of IoT devices as a plurality of first devices and a plurality of second devices;
computing a device number of the first devices connected with each of the plurality of gateways, and computing a gateway number of the gateways which are capable of being connected to the second devices;
computing a load index associated with the device number and the gateway number of each of the plurality of gateways;
computing a transmission energy consumption index of a first link between each of plurality of gateways and each of the plurality of computation servers;
selecting, according to the load index and the transmission energy consumption index of each of the plurality of gateways, the gateways which are to perform communication; and
obtain a communication network, wherein the communication network comprises the plurality of first devices, the plurality of second devices, and the gateways as selected.

15. The decision method of claim 14, further comprising:
analyzing the signal quality of each of the plurality of IoT devices; and
determining whether the signal quality comprises an interference signal when the signal quality is smaller than a first threshold.

16. The decision method of claim 15, further comprising:
determining whether strength of the interference signal is larger than a second threshold when the signal comprises the interference signal; and
tagging the plurality of IoT devices as the second devices when the strength of the interference signal is larger than the second threshold.

17. The decision method of claim 16, wherein IoT devices of the IoT devices, that are not tagged as the plurality of second devices, are tagged as the first devices.

18. The decision method of claim 14, wherein the device number is a number of the first devices which are connected with each of the plurality of gateways, wherein the decision method further comprises:
computing a number of all the gateways to which the second devices belongs in condition that the second devices are connected with each of the plurality of gateways, in order to obtain the gateway number; and
computing, according to the number of the devices and the gateway number, the load index of each of the plurality of gateways.

19. The decision method of claim 14, wherein the transmission energy consumption index of each of the plurality of gateways is a reciprocal of an average of an energy consumption sum of the first link.

20. The decision method of claim 14, further comprising:
computing, according to a square of an energy consumption sum of the first link and a sum of an energy consumption square of the first link, a transmission path flexible index of each of the plurality of gateways.

21. The decision method of claim 20, further comprising:
computing a sum of the load index, the transmission energy consumption index, and the transmission path flexible index of each of the plurality of gateways; and
setting, according to an order of the sum, the gateways which are configured to perform communication as a plurality of first gateways;
wherein the communication network comprises the plurality of first devices, the plurality of second devices, and the plurality of first gateways.

22. The decision method of claim 21, further comprising:
setting the gateways which are configured to communicate with the plurality of first devices, as the plurality of first gateways; and
setting, according to the order of the sum of the load index, the transmission energy consumption index, and the transmission path flexible index of each of the plurality of gateways, some of the gateways as the plurality of gateways which are configured to establish links to the plurality of second devices;
wherein when each of the plurality of second devices is connected, with a default number of links, to some of the plurality of first gateways, and the gateways which are not set as the first gateways are stopped setting.

23. The decision method of claim 21, further comprising:
setting the gateways which are not selected to enter a sleep mode.

24. The decision method of claim 21, further comprising:
obtaining a first link cost of the first link between each of the plurality of first gateways and each of the plurality of computation servers;
obtaining a second link cost of a second link between each of the plurality of first gateways and each of the plurality of first devices and between each of the plurality of first gateways and each of the plurality of second devices; and
computing a third link cost of a third link, wherein the third link cost is a number of links among the plurality of computation servers.

25. The decision method of claim 21, further comprising:
obtaining a plurality of network topologies where the plurality of first devices and the plurality of second devices are served;
computing a plurality of topology costs of the plurality of network topologies according to a first link cost, a second link cost, and a third link cost; and
setting, among the plurality of computation servers a plurality of first servers which are to perform communication according to a smallest topology cost of the plurality of topology cost.

26. The decision method of claim 25, further comprising:
obtaining the communication network, wherein the communication network comprises the plurality of first devices, the plurality of second devices, the plurality of first gateways, and the plurality of first servers.

* * * * *